United States Patent
Yamashita

[11] Patent Number: 5,566,368
[45] Date of Patent: Oct. 15, 1996

[54] CASSETTE COMPARTMENT MECHANISM HAVING MEMBER FOR CLOSING CASSETTE LID WHEN CASSETTE IS WITHDRAWN

[75] Inventor: Norio Yamashita, Tokyo, Japan

[73] Assignee: TEAC Corporation, Japan

[21] Appl. No.: 360,231

[22] Filed: Dec. 20, 1994

[30] Foreign Application Priority Data

Dec. 24, 1993 [JP] Japan .................................. 5-069411

[51] Int. Cl.⁶ .................................................. G11B 15/60
[52] U.S. Cl. ........................... 360/96.5; 360/93; 360/96.6
[58] Field of Search ............................ 360/85, 95, 96.5, 360/96.6, 93; 242/335, 338, 338.2

[56] References Cited

U.S. PATENT DOCUMENTS

| | | | |
|---|---|---|---|
| 4,792,872 | 12/1988 | Nakanishi et al. | 360/96.5 |
| 4,796,117 | 1/1989 | Fleck | 360/96.5 |
| 4,855,848 | 8/1989 | Yamada et al. | 360/96.5 |
| 4,985,791 | 1/1991 | Yamagishi | 360/96.5 |
| 5,124,854 | 6/1992 | Iyota et al. | 360/96.6 |
| 5,291,354 | 3/1994 | Kim | 360/96.5 |
| 5,390,055 | 2/1995 | Maehara et al. | 360/85 |
| 5,390,057 | 2/1995 | Nishimura et al. | 360/96.5 |

FOREIGN PATENT DOCUMENTS

| | | |
|---|---|---|
| 63-86143 | 4/1988 | Japan . |
| 63-211153 | 9/1988 | Japan . |
| 3-102137 | 10/1991 | Japan . |

*Primary Examiner*—Jefferson Evans
*Attorney, Agent, or Firm*—Andrus, Sceales, Starke & Sawall

[57] ABSTRACT

A holder unit receives a cassette therein, the cassette containing a recording tape and having a lid unit thereon. A lid pressing member comprises a pair of sliding portions which come into contact with two opposite end portions of the lid unit of the cassette while the cassette is being withdrawn from the holder unit if the lid unit is in an opened state. The cassette is withdrawn from the holder unit in a certain direction. Each of the pair of sliding portions has a slope which comes into contact with the lid unit, an angle formed between the slope and the certain direction being equal to or less than 15°. The lid pressing member has a cut out portion between the pair of sliding members so that the pressing member comes into contact only with the two end portions of the lid unit and, at least at first, does not come into contact with a middle portion of the lid unit.

9 Claims, 8 Drawing Sheets

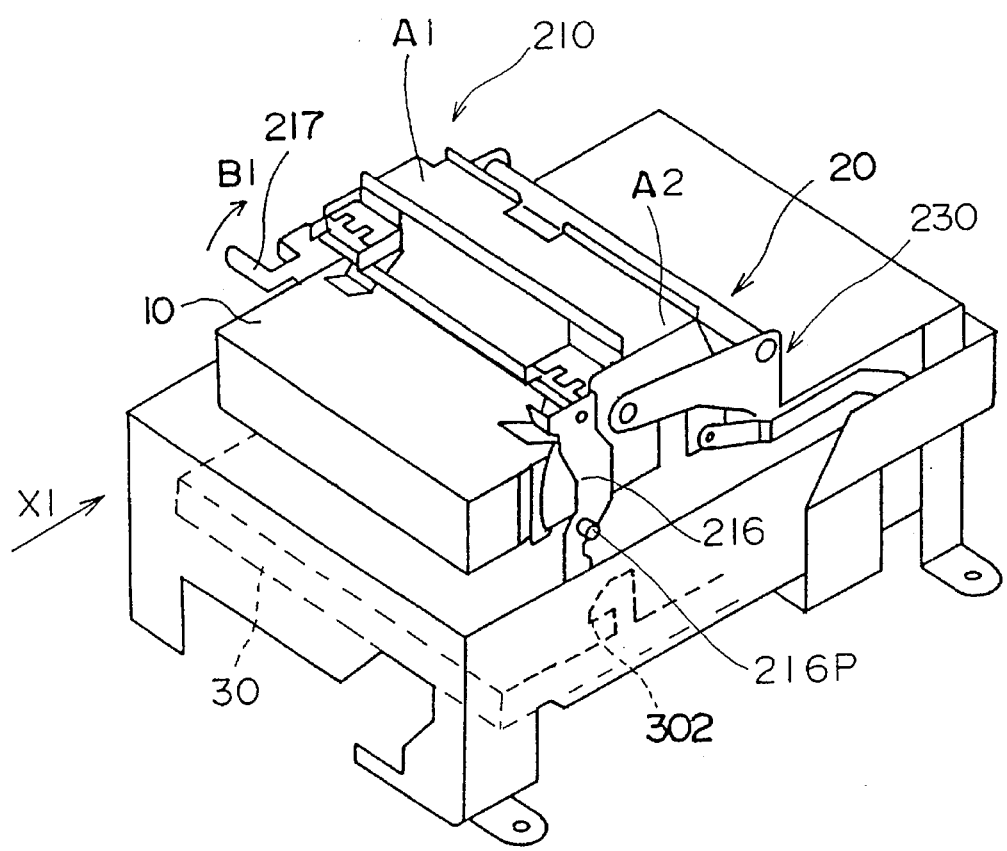
FIG. I PRIOR ART

F I G. 9
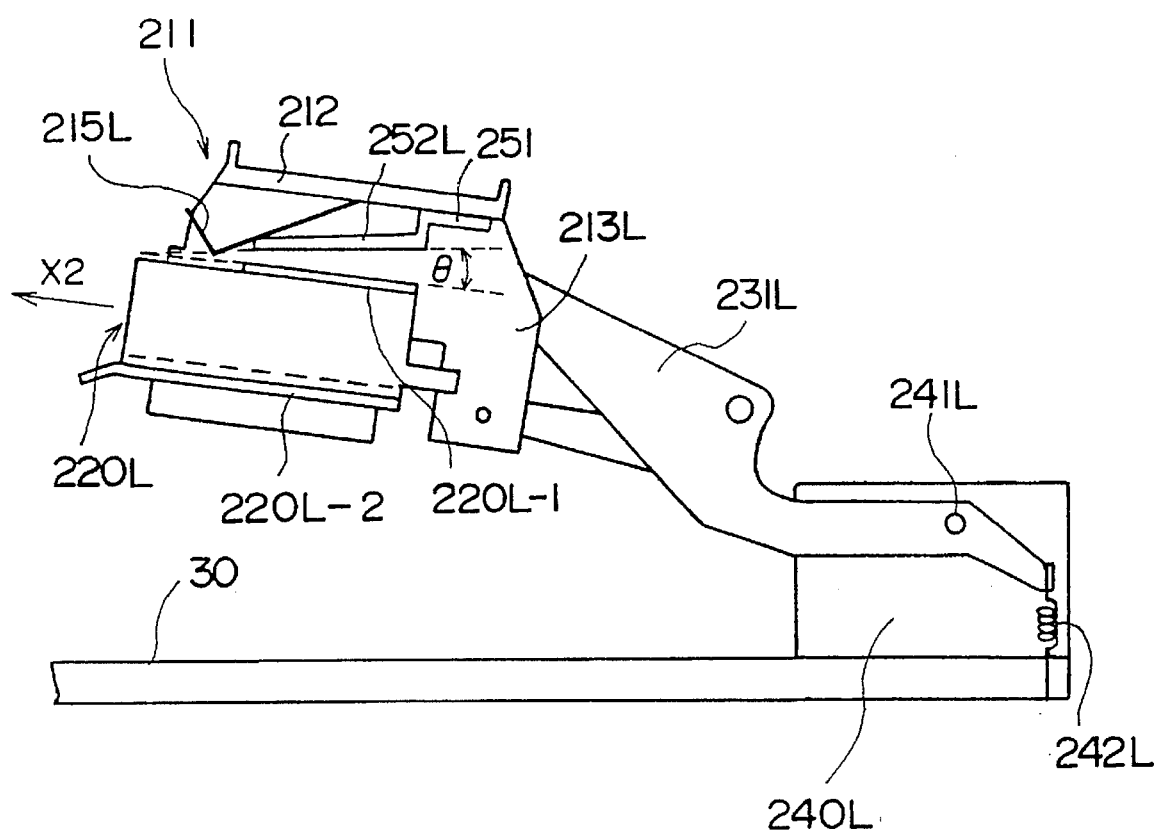

CASSETTE COMPARTMENT MECHANISM HAVING MEMBER FOR CLOSING CASSETTE LID WHEN CASSETTE IS WITHDRAWN

BACKGROUND OF THE INVENTION

1. Field of the Invention

The present invention relates to a cassette compartment mechanism, in particular to a cassette compartment mechanism through which a video cassette having a lid, such as a video cassette for containing a video recording tape according to a standard of a so-called '8 millimeter video tape' is handled in a video recording/reproducing apparatus. A video cassette which includes a video tape of the 8 millimeter video standard will be referred to as '8-mm video cassette', hereinafter.

Related typical standards will now be listed below:

EIAJ (Electronics Industries Association of Japan), No. CP-3103, entitled 8-*mm Video.8-mm Magnetic Tape Helical Scan Video Cassette System;*

JIS (Japanese Industrial Standard), No. JISC 5583 (1992), entitled 8-*mm Video.8-mm Magnetic Tape Helical Scan Video Cassette System*; and IEC (International Electrotechnical Commission publication), No. 843 (1987), entitled *Helical Scan Video Cassette System using* 8-*mm Magnetic Tape Video-8*. Further, a separate edition of Electronics Life, a journal of Nippon Hoso Shuppan Kyokai (Japan Broadcasting Publishing Society) published Jun. 20, 1985, entitled *The Latest Video, from 8-mm video to high fidelity (HiFi) video* discloses a structure of the 8-mm video cassette.

2. Related Art

In the video recording/reproducing apparatus, the cassette compartment mechanism holds the video cassette, containing a video tape therein, and transports the thus-held cassette between an inserted position and an operation position. The inserted position is a position at which a user may put the cassette in the video recording/reproducing apparatus, and from which position the user may withdraw the inserted cassette so as to take it out of the apparatus. While the cassette is positioned at the above-mentioned operation position, a part of the recording tape contained in the cassette faces a recording/reproducing head provided in the apparatus.

Ordinarily, the cassette compartment mechanism is provided with a cassette holder unit and a supporting arm unit. Into the cassette holder unit, the video cassette is inserted by an operator and the cassette holder unit then holds the thus-inserted cassette. The supporting arm unit supports the cassette holder unit and move the holder unit so as to cause it either to approach a base (chassis) or to go away therefrom. On the base, a mechanism for driving (winding) a recording tape contained in the cassette and the recording/reproducing head are mounted.

With reference to FIG. 1, an example of a cassette compartment mechanism 20 will now be described in general. The cassette compartment mechanism 20 shown FIG. 1 is a cassette compartment mechanism of a hop up type. In the mechanism 20, a holder unit 210 acts as the above-mentioned cassette holder unit and an arm unit 230 acts as the above-mentioned supporting arm unit. When a cassette 10 is loaded in a relevant recording/reproducing apparatus, an operator first inserts the cassette 10 into the holder unit 210 along a direction X1 shown in FIG. 1. Then, the operator pushes the holder unit 210 at positions A1 and A2 downward. Thus, the holder unit 210 having the cassette 10 therein is lowered from a top position (corresponding to the above-mentioned inserted position) to a bottom position (corresponding to the above-mentioned operation position) at which a tape contained in the cassette 10 can be wound through a tape winding mechanism of the recording/reproducing apparatus.

After the holder unit 210 is lowered to the bottom position, a projection 216P of a lock lever 216 mounted on the holder unit 210 is engaged by a hook 302 formed on the base (chassis) 30, the holder unit 210 being thus connected to the base 30 through the engagement.

If the operator turns a release lever 217 in a direction B1 shown in FIG. 1, the turning of the lever 217 causes, through a not shown mechanism, the lock lever 216 to turn so that the engagement of the projection 216P with the hook 302 is released. As a result, since an upward force is applied to the holder unit 210 through a not shown mechanism in a state in which the holder unit 210 is located at the bottom position, the holder unit 210 is automatically raised to the top position through a certain mechanism.

Although not shown in the figure, the release lever 217 also has a projection thereon similar to the projection 216P provided on the lock lever 216 but projecting outward oppositely to the projection 216P. Further, another hook is also provided on the base 30. These projection and hook act similarly to and simultaneously with the above-described action of the projection 216P and hook 302 but at the opposite side with respect to holder unit 210. Thus, when the holder unit 210 is positioned at the bottom position, the holder unit 210 is connected at the two sides thereof to the base 30 through the engagements. The engagements prevent the holder unit 210 from being raised from the bottom position.

As it is well known, the 8-mm video cassette includes a case containing a recording tape and the case has a lid for preventing dust from coming into the case. With reference to FIGS. 2A and 2B, a structure of the typical 8-mm video cassette will now be described. The cassette 10 has the case 101 containing the recording tape 110 and the case 101 has the lid unit 102 in front thereof as shown in the drawings. The lid unit 102 includes a main lid 103 and a sub-lid 104. The sub-lid may be called 'an inner lid'. The main lid 103 is supported on the case 101 rotatably about a axis shaft 105. The sub-lid 104 is rotatably supported on the main lid 103.

When the cassette 10 is inserted into the holder unit 210 of the cassette compartment mechanism 20 shown in FIG. 1, a nail member not shown in the drawings raises the main lid 103 as shown in FIG. 2B, through the cassette compartment mechanism. As a result, a front extending part of the recording tape 110 is exposed and thus the recording/reproducing head mounted on the base can access the part of the recording tape. The sub-lid 104 moves in response to the above-mentioned raised movement of the main lid 103 so that a front part of the sub-lid 104 is placed on a front part of the main lid 103 as shown in FIG. 2B. Thus, in an opened state shown in FIG. 2B of the lid unit 102 in which the part of the recording tape is exposed, the sub-lid 104 is lifted on the front part of the main lid 103. It seems that the provision of the sub-lid 103 is advantageous for preventing dust from coming into the case in a closed state shown in FIG. 2A of the lid unit 102.

A force is always applied to the main lid 103 through a not shown spring provided in the cassette 10. Thus, if the cassette 10 is being withdrawn from the holder unit 210, a not shown mechanism causes the above-mentioned nail member to be removed from the main lid 103 so that the main lid 103 automatically moves to cover the front of the case 101. Thus, the once exposed part of the recording tape 110 is covered by the main lid 103 and sub-lid 104 before the cassette is completely withdrawn from the holder unit 210 of the cassette compartment mechanism. The above-mentioned lid opening and closing operations due to the function of the nail member may be performed either in the process in which the cassette 10 is inserted into/withdrawn from the holder unit 210 or in the process in which the holder unit 210 is lowered/raised between the top position and bottom position.

In the structure of the 8-mm video cassette described above, the above-mentioned spring, which applied the force to the main lid 103 so as to move the main lid 103 to cover the recording tape, may change in its elastic capability due to aging. Thus, the above-mentioned force may become weakened. In such a case, even if the cassette 10 is being withdrawn from the holder unit 210 of the cassette compartment mechanism 20, the main lid 103 cannot automatically move to cover the recording tape. That is, the lid unit 102 is left in the state shown in FIG. 2B. Further, the same phenomenon may occur as a result of, for a certain reason, the sub-lid 104 is undesirably engaged with the main lid 103 in the state shown in FIG. 2B. Thus, the sub-lid 104 is prevented from smoothly sliding on the main lid 103 and thus the main lid 103 is not allowed to move downward to cover the recording tape.

The operator may attempt to withdraw the cassette 10 from the holder unit 210 so as to completely take out the cassette 10 from the holder unit 210, the lid unit 102 being in the state shown in FIG. 2B. If so, problems may occur, in which the main lid 103 and/or sub-lid 104 is engaged with one of members constituting the holder unit 210. In particular, the sub-lid 104 is lifted on the front part of the main lid 103 as shown in FIG. 2B in the opened state. Thus, the sub-lid 104 is projected upwardly and thus is likely to be undesirably engaged with a member of the holder unit 210. Thus, the cassette 10 cannot be withdrawn. In such a case, if the operator forcibly attempts to withdraw the cassette 10 from the holder unit 210, the lid unit 102 may be damaged.

SUMMARY OF THE INVENTION

An object of the present invention is to provide the cassette compartment mechanism which has a function such that even if the cassette 10 has the lid unit 102 that is problematic from a viewpoint of smooth entering to the closed state from the opened state, the lid unit 102 is prevented from being undesirably engaged with a member of the holder unit 210. Thus, the cassette 10 can be smoothly withdrawn from the holder unit 210.

The cassette compartment mechanism according to the present invention comprises:

a holder unit for receiving a cassette therein, said cassette containing a recording tape and having a lid unit thereon; and a lid pressing member comprising a pair of sliding portions which come into contact with two opposite end portions of said lid unit of said cassette while said cassette is being withdrawn from said holder unit if said lid unit is in an opened state.

Further, it is preferable that:

said cassette is withdrawn from said frame in a certain direction; and each of said pair of sliding portions has a slope which comes into contact with said lid unit, an angle formed between said slope and said certain direction being equal to or less than 15°.

In such a structure, even if the cassette is being withdrawn in the lid unit being in the opened state, the pair of sliding members come into contact with the lid unit while the cassette is being withdrawn. As a result, the lid unit enters into its closed state as a result of a top portion of the lid unit being pressed down. Thus, the holder unit is prevented from being undesirably engaged with the lid unit, the undesirable engagement preventing the cassette from being smoothly withdrawn from the holder unit.

Further, the angle may be appropriately selected, the angle being that formed between the slope of the sliding portions and the certain direction along which the cassette is withdrawn, and being equal to or less than 15°. Thus, force can be applied to the lid unit through the sliding portions in a direction which effectively results in the lid unit smoothly entering the closed state from the open state.

Other objects and further features of the present invention will become more apparent from the following detailed description when read in conjunction with the accompanying drawings.

BRIEF DESCRIPTION OF DRAWINGS

FIG. 1 shows a perspective view of a cassette compartment mechanism in the related art;

FIG. 9 shows a sectional elevational view of the cassette compartment mechanism shown in FIG. 3 together with the lid pressing member mounted therein.

DESCRIPTION OF THE PREFERRED EMBODIMENT

With regard to the drawings, one embodiment of a cassette compartment mechanism according to the present invention will now be described.

Figure 3:
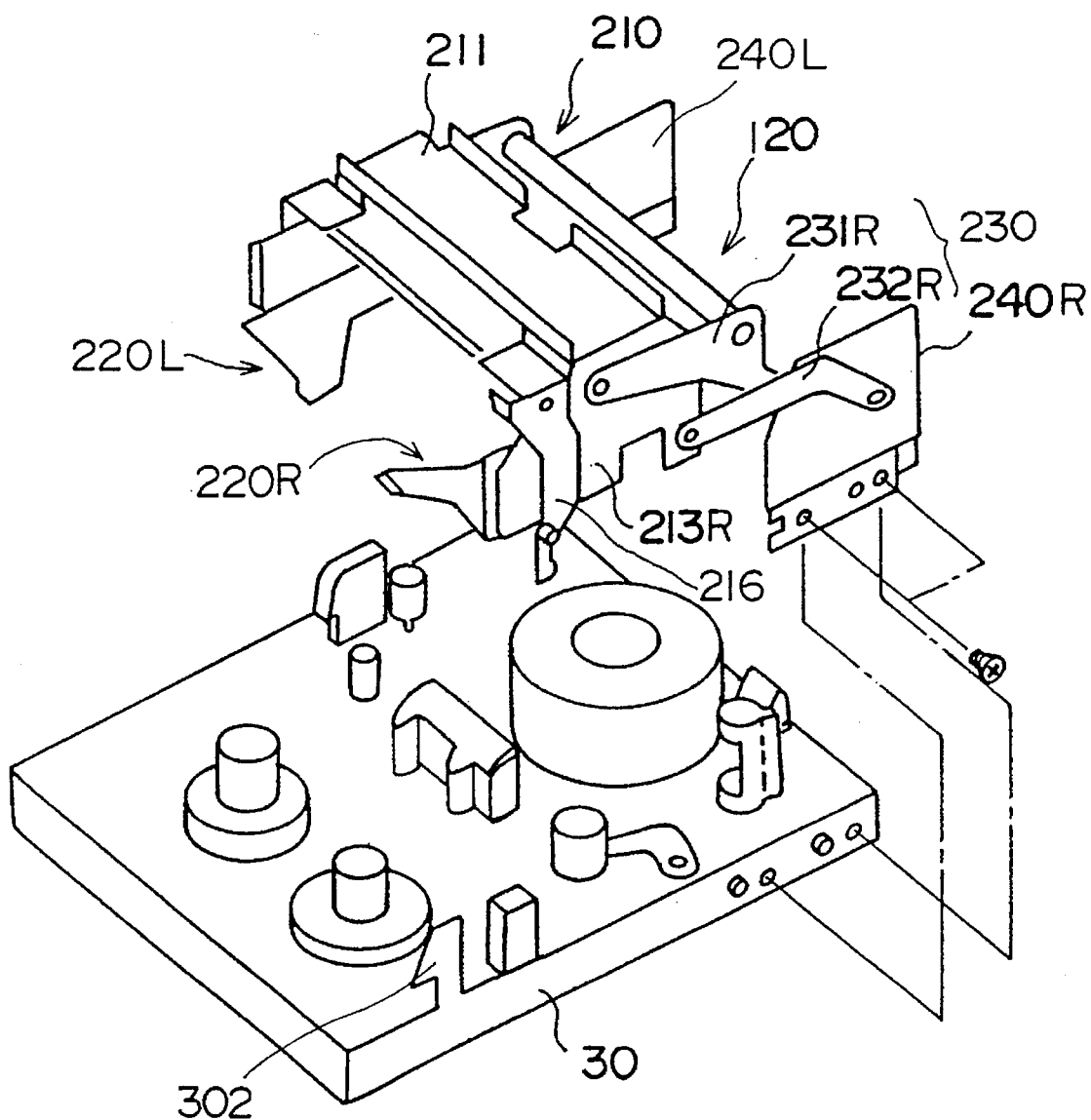
FIG. 3 shows an exploded perspective view of a cassette compartment mechanism in one embodiment of the present invention, but a lid pressing member being not shown.

FIG. 3 shows an exploded perspective view of the cassette compartment mechanism 120 in the embodiment of the present invention together with the base 30.

Figure 5A:
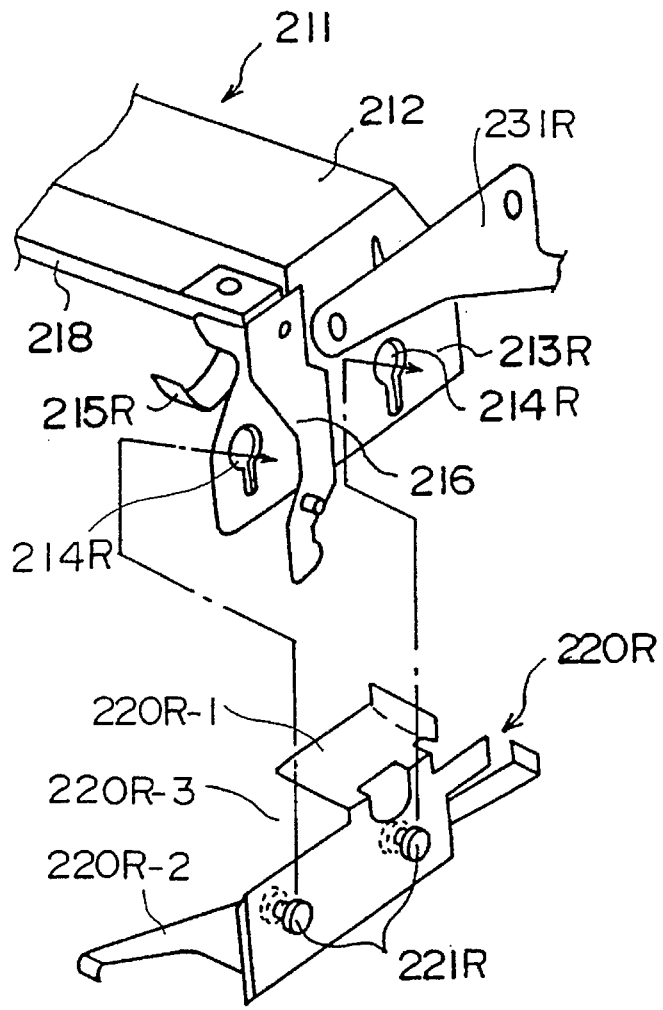
FIGS. 5A and 5B show partial exploded perspective views illustrating how to set cassette holders in a frame in the cassette compartment mechanism shown in FIG. 3.
Figure 5B:
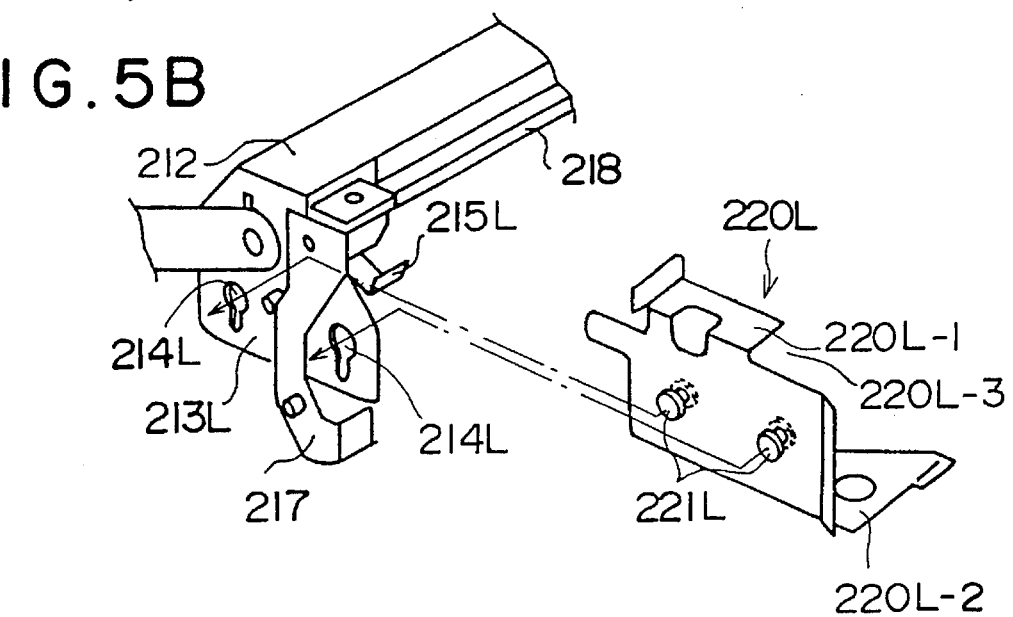

The cassette compartment mechanism 120 includes, as essential components thereof, the holder unit 210 and the arm unit 230. The holder unit 210 includes a right cassette holder 220R and a left cassette holder 220L, and a frame 211 supporting the pair of the cassette holders 220R and 220L. The cassette holder 220R includes, as shown in FIG. 5A, a top plate 220R-1, a bottom plate 220R-2, and a cut out portion 220R-3 located in front of the top plate 220R-1. Similarly, the cassette holder 220L includes, as shown in FIG. 5B, a top plate 220L-1, a bottom plate 220L-2, and a cut out portion 220L-3 located in front of the top plate 220L-1.

The arm unit 230 includes a right first arm 231R and a left first arm (not shown in the figure), and a right second arm 232R and a left second arm (not shown in the figure). The right first arm 231R and right second arm 232R are pivotably supported on a right holder stand 240R. The two holder stands 240R and 240L are screwed on the base 30 as shown in FIG. 3. The left first arm and left second arm are rotatably supported on a left holder stand 240L. The pair of first arms and pair of second arms support the frame 211 in a state in which the frame 211 can move upward and downward.

The frame 211 includes a right side plate 213R and left side plate (not shown in the figure) formed at the two sides thereof. The right first arm 231R and right second arm 232R constitute a link mechanism together with the right side plate 213R. The left first arm 231R and left second arm 232R constitute a link mechanism together with the left side plate 213R. Thus, the thus-constituted link mechanisms support the holder unit 210 on the holder stands 240R and 240L in a manner in which the holder unit 210 can move upward and downward.

Figure 4A:
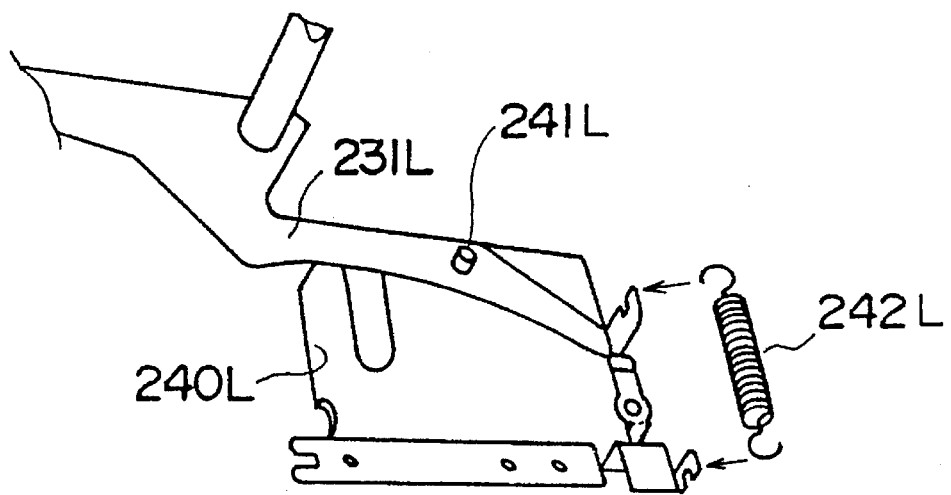
FIGS. 4A and 4B show partial exploded perspective views illustrating how to set first arms on holder stands in the cassette compartment mechanism shown in FIG. 3.
Figure 4B:
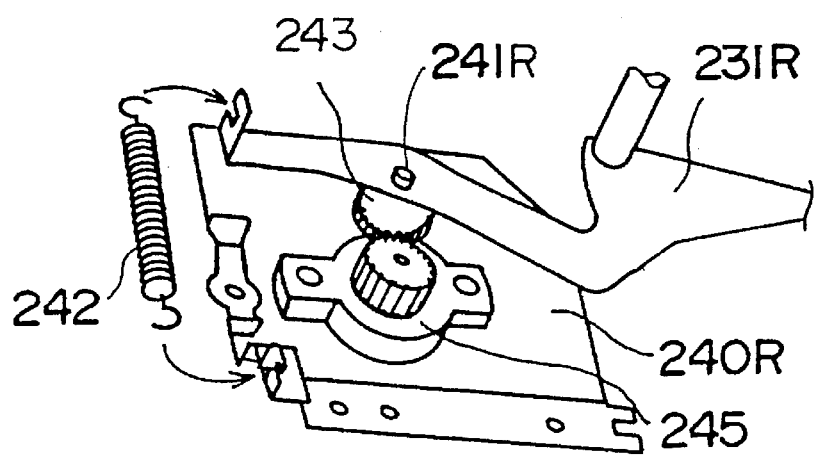

FIGS. 4A and 4B show structures in which the right first arm 231R and left first arm are mounted on the right and left holder stands 240R and 240L, respectively. The right first arm 231R and left first arm 231L are supported on inner walls of the right and left holder stands 240R and 240L via a right shaft 241R and left shaft 241L, respectively, as shown in the figures. Further, coil springs 242R and 242L are provided so that an end of a respective one of the first arms 231R and 231L and an end of a respective one of the holder stands 240R and 240L are fixed at two ends of each of the springs 242R and 242L, as shown in the figures. The thus-fixed ends of the first arms 231R and 231L are ends opposite to other ends directly supporting the side plates 213R and 213L and ends located right rear side in FIG. 3. The coil springs 242R and 242L draw the ends of the first arms 231R and 231L downward. Thus, force is applied, through the first arms 231R and 231L, to the other ends directly supporting the side plates 213R and 213L. As a result, the force applied to the first arms 231R and 231L causes the holder unit 210 to be always positioned at the above-mentioned top position. That is, the holder unit 210 is away from the base 30.

As shown in FIG. 4B, a gear 243 is mounted on the right first arm 231R and a damper 245 is rotatably supported on the right holder stand 240R. The damper 245 has a gear which is engaged with the gear 243 mounted on the right first arm 231R. As a result, the damper 245 is rotated in response to the rotation of the right first arm 231R. A case is considered in which the lock lever 216 is disengaged from the hook 302 and thus the holder unit 210 is being raised due to the coil springs 242R and 242L applying the force to the first arms 231R and 231L. In the situation of the above-considered case, the damper 245 prevents the right first arm 231R from being rotated suddenly rapidly due to an inertia of the damper 245. Thus, the holder unit 210 is prevented from being raised suddenly rapidly and is raised relatively slowly.

FIGS. 5A and 5B show structures in which the cassette holders 220R and 220L are supported on the side plates 213R and 213L of the frame 211. The frame 211 consists of the pair of the side plates 213R and 213L, and a top plate 212. The side plates 213R and 213L hang down from the two sides of the top plate 212 as shown in the figures. The side plates have engagement holes 214R and 214L, and the cassette holders 220R and 220L have pins 221R and 221L. Each of the engagement holes 214R and 214L has a keyhole shape. Each of the pins 221R and 221L has a shape such that a projecting end has a diameter larger than a diameter of a neck. Each of the pins is inserted into a respective one of the engagement holes. Since the necks of the pins can move downward and upward within the thin extending portion of the holes, the cassette holder 220R and 220L are supported on the frame 11 but can move downward and upward with respect to the frame 211. Ends of leaf springs 215R and 215L are supported on the two sides of the frame 211 as shown in FIGS. 5A and 5B. The other ends of the leaf springs 215R and 215L downwardly press the top surface of the cassette 10 via the cut out portions 220R-3 and 220L-3 due to the elasticity thereof, if the cassette 10 is held in the holder unit 210 and the holder unit 210 is located at the top position.

As a result of providing the above-described structures shown in FIGS. 5A and 5B, the following operation can be achieved: A situation is considered in which the cassette 10 was inserted in to the holder unit 210 and then the holder unit 210 was pressed down so that the holder unit 210 moved from the top position to the bottom position. Under the situation in which the holder unit 210 is positioned in the bottom position, the cassette holders 220R and 220L are positioned at a position (height) with respect to the frame 211. This position of the cassette holders 220R and 220R is referred to as a higher position, hereinafter.

The situation where the cassette holders 220R and 220L are located at the above-mentioned higher position will now be described. Four cassette supporting pins, not shown in the figures, upwardly projected from the base 30 are provided. The four cassette supporting pins support the cassette 10 at a height, when the holder unit 210 is positioned in the bottom position, although the leaf springs 215R and 215L downwardly press the cassette 10. Further, other holder supporting pins, also not shown in the figures, upwardly projected from the base 30 are provided. The holder supporting pins support the cassette holders 220R and 220L when the holder unit 210 is positioned at the bottom position. Thus, the top surface of the cassette 10 is spaced from the top plate 220L-1 and from the top plate 220R-1. Further, the bottom surface of the cassette 10 is spaced from the bottom plate 220L-2 and from the bottom plate 220R-2. Further, each of the pins 221R and 221L is located at a middle height in a respective one of the engagement holes 214R and 214L, shown in FIGS. 5A and 5B. Why the cassette 10, and the cassette holders 220R and 220L are supported by the cassette supporting pins and the holder supporting pins when the holder unit 210 is positioned at the bottom position will now be described. By this supporting, the bottom surface of the cassette 10, and the bottom plates 220R-2 and 220L-1 of the cassette holders 220R and 220L are spaced from the top surface of the base 30. The top surface of the base 30 has certain mechanisms thereon. That supporting prevents the certain mechanisms from being adversely affected by the cassette 10 and/or the cassette holders 220R and 220L. Adverse consequences might be caused if either the cassette 10 or the cassette holders 220R and 220L came into contact with the certain mechanisms provided on the base 30.

Another situation is considered in which the holder unit 210 having the cassette 10 therein is raised from the bottom position to the top position. Under the situation in which the holder unit 210 is positioned in the top position, the cassette holders 220R and 220L are positioned at a lowest position with respect to a position of the frame 211. When the cassette holders are at the lowest position, the pins 221R and 221L are positioned at the bottom ends of the engagement holes 214R and 214L due to the leaf springs 215R and 215L pressing down the cassette 10 and thus, via the cassette 10 and the bottom plates 220R-2 and 220L-2, pressing down the cassette holders 220R and 220L. Thus, the cassette holders 220R and 220L move with respect to the frame 211 in response to the holder unit 210 being lowered and raised between the top position and bottom position.

Figure 6:
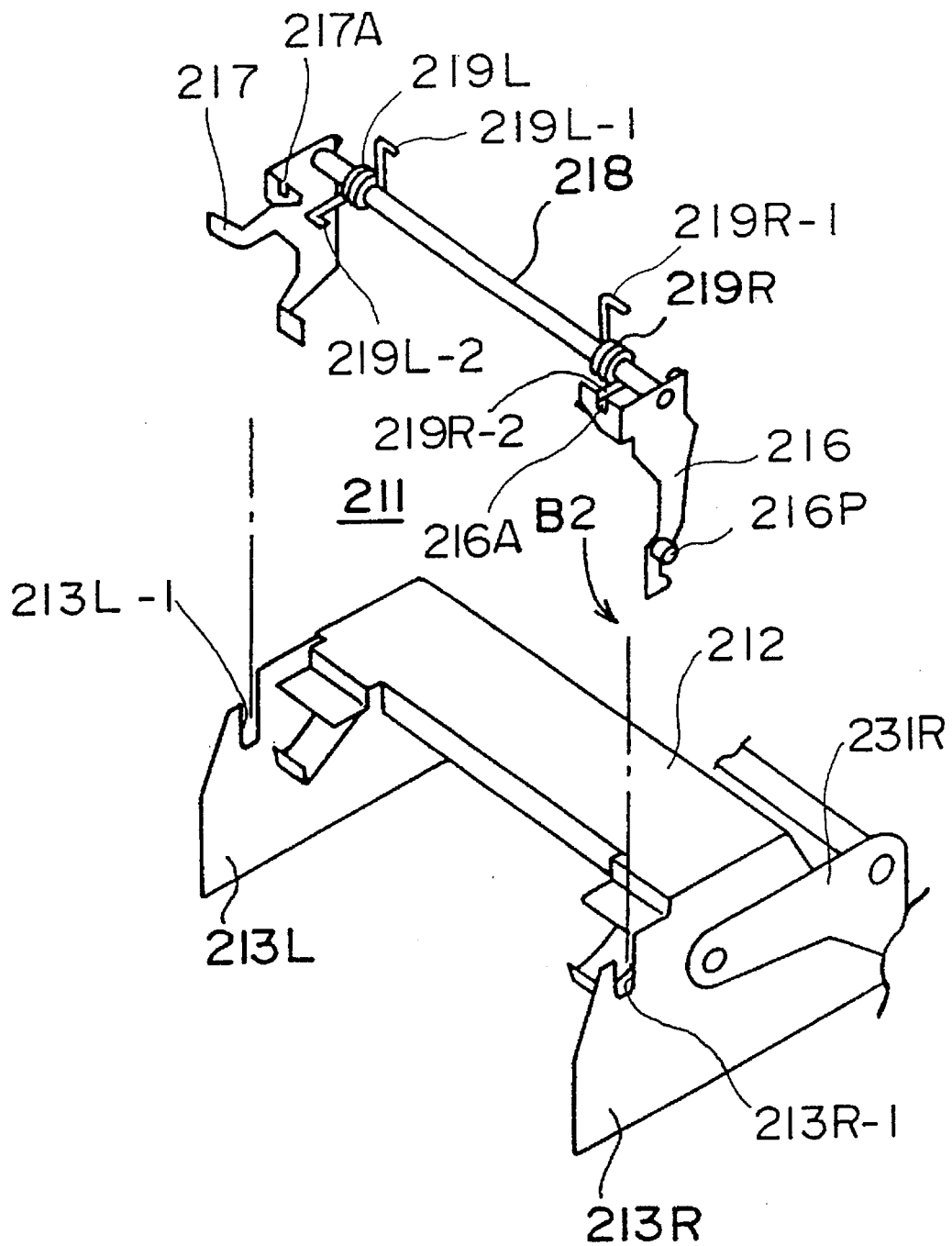
FIG. 6 shows a partial exploded perspective view illustrating how to set a lock lever and a release lever on the frame in the cassette compartment mechanism shown in FIG. 3.

Further, as shown in FIG. 6, the lock lever 216 and the release lever 217 are fixed at two ends of a shaft 218. The shaft 218 is supported on the side plates 213R and 213L in cut out portions 213R-1 and 213L-1 formed at the top of the side plates. The shaft 218 can turn in the cut out portions 213R-1 and 213L-1. Torsion springs 219 are wound on the shaft 218 at the two sides. Ends 219L-2 and 219R-2 of the springs 219 are hung in cut out portions 217A and 216A formed on the levers 217 and 216. The other ends 219L-1 and 219R-1 are hung in cut out portions 225L-1 and 225R-1 formed on extending members 225L and 225R shown in FIG. 7. The extending members 225L and 225R are included in the frame 211. Due to elasticity of the torsion springs 219R and 219L, force is always applied to shaft 218 to turn so that the lock lever 216 may rotate in a direction B2 shown in FIG. 6. Due to this force, if the holder unit 210 is lowered and thus is positioned at the bottom position, the projection 216P of the lock lever 216 is engaged with the hook 302 of the base 30, shown in FIG. 3 and the engagement is maintained. Similarly, the projection provided on the release lever 217 is engaged with the relevant hook of the base 30 located at the opposite side to the hook 302 and the engagement is maintained. Thus, the holder unit 210 is prevented from being raised unless the release lever 217 is operated to release the engagement. A force may be applied to the release lever 217 to cause it to be rotated in a direction such as the direction B1 shown in FIG. 1, the force overcoming the force applied by the torsion springs 219R and 219L. If such force is applied to the release lever 217, the release lever is rotated in the direction B1. As a result, the shaft 218 turns and the lock lever 216 is thus rotated in the direction opposite to the direction B2. Thus, the engagement of the projection 216P with the hook 302 and the engagement of the other projection provided on the release lever 217 with the relevant hook are released. As a result, due to the elasticity of the coil springs 242R and 242L, the holder unit 210 is automatically raised to the top position.

Figure 7:
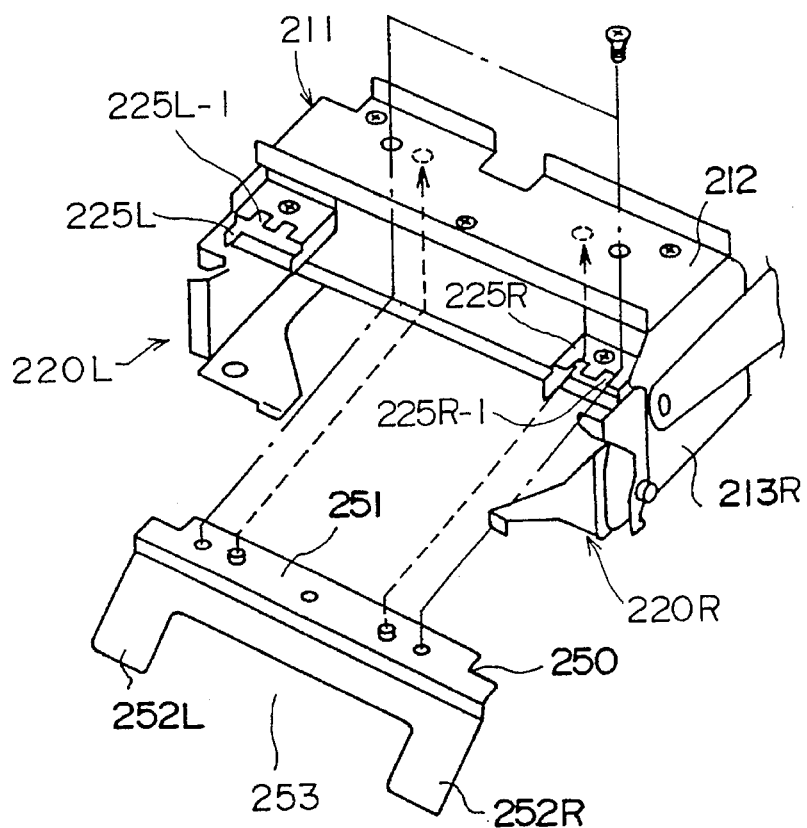
FIG. 7 shows a partial exploded perspective view illustrating how to mount the lid pressing member in the frame in the cassette compartment mechanism shown in FIG. 3.
Figure 8:
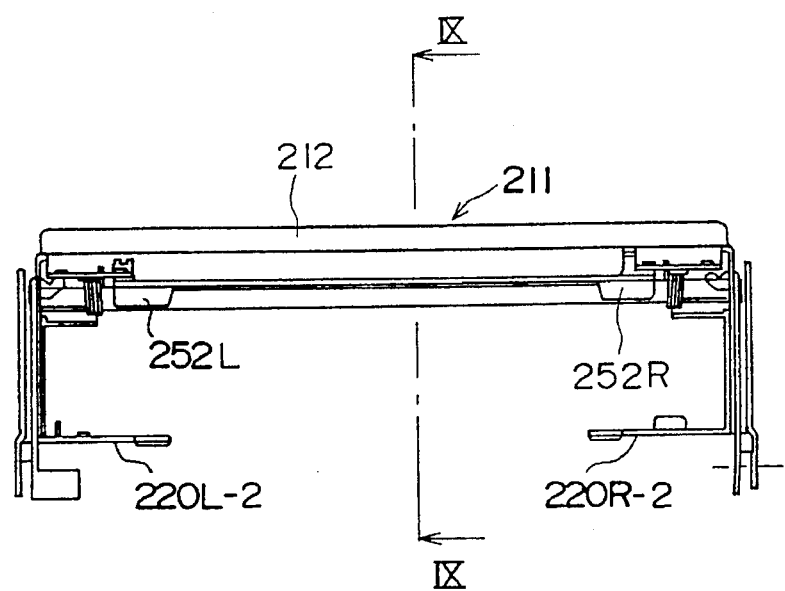
FIG. 8 shows a front elevational view of a holder unit including the lid pressing member in the cassette compartment mechanism shown in FIG. 3.

The cassette compartment mechanism in the embodiment of the present invention has a lid pressing member 250, shown in FIGS. 7, 8 and 9, mounted on the frame 211 of the holder unit 210. FIG. 9 shows a elevational sectional view taken along a line IX—IX shown in FIG. 8.

Figure 2A:
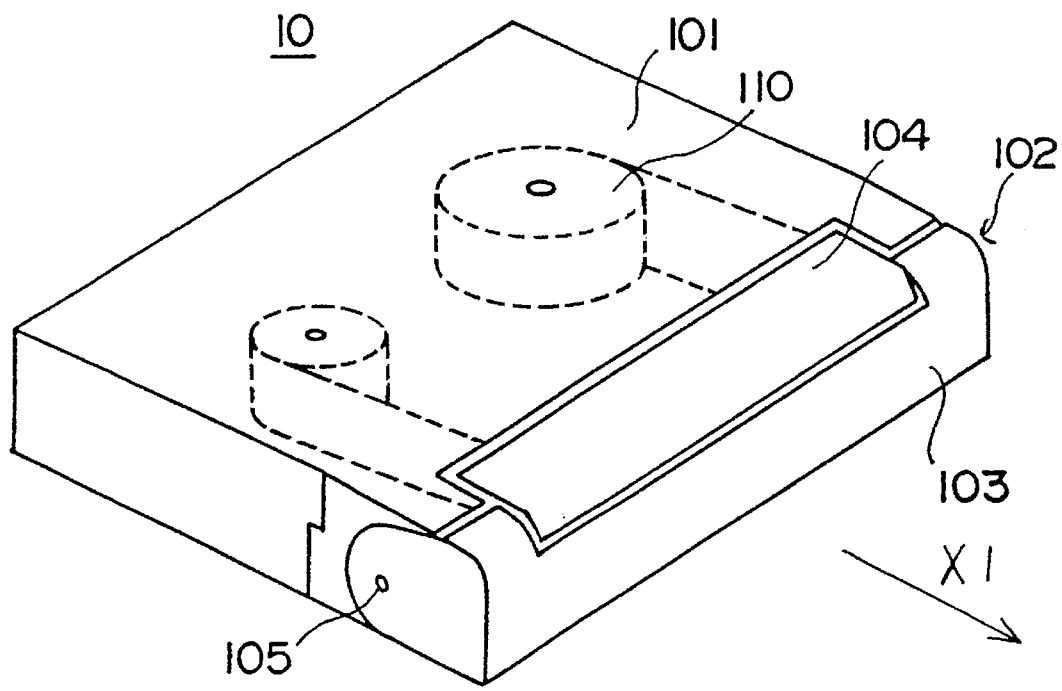
FIGS. 2A and 2B illustrate a general structure of the 8-mm video cassette.
Figure 2B:
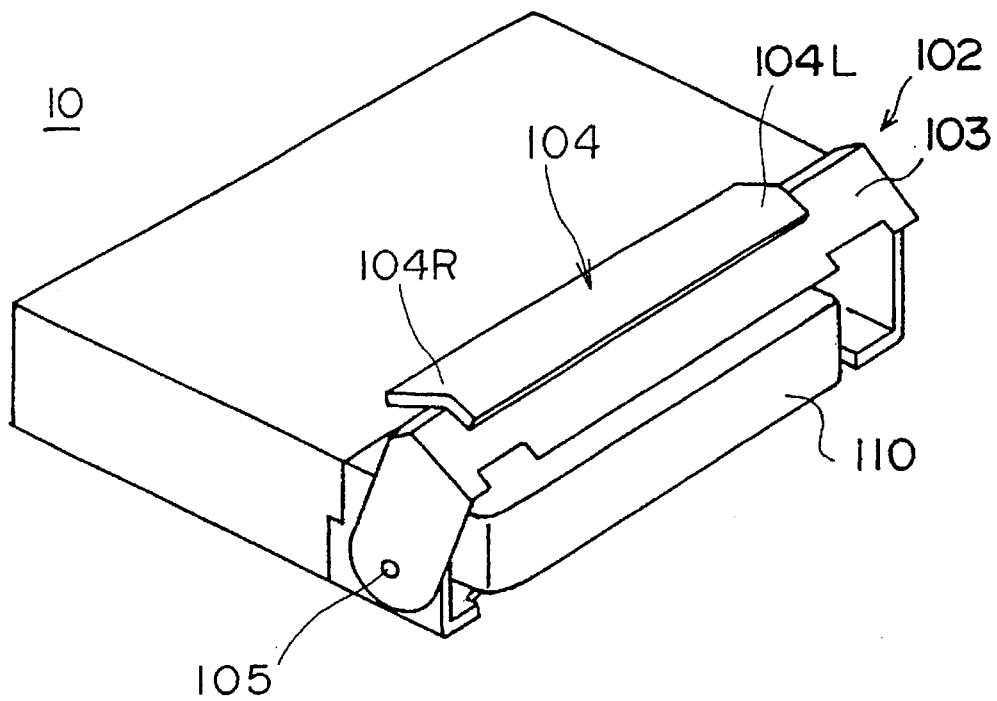

The lid pressing member 250 includes a mounting portion 251 and a pair of sliding portions 252R and 252L shown in FIGS. 7 and 8. The mounting portion 251 is used to mount the lid pressing member 250 onto a bottom side of the top plate 212 of the frame 211 as shown in FIG. 7. The pair of the sliding portions 252R and 252L, having tongue shapes, extend from two sides of the mounting portion 251 as shown in FIG. 7. As a result, a cut out portion 253 is present between the pair of the sliding portions 252R and 252L. The sliding portions' extending direction is, as shown in FIG. 9, a direction which is offset toward the bottom direction by an angle Θ from a direction X2 along which the cassette 10 is withdrawn from the holder unit 210. The pair of sliding portions come into contact with the sub-lid 104 at two end portions 104R and 104L shown in FIG. 2B when the cassette 10 is withdrawn from the holder unit 10, the cassette having the sub-lid 104 at the opened state shown in FIG. 2B.

It is noted that the cassette 10 is inserted into the holder unit 210 in a direction X1 such as the direction X1 shown in FIG. 1. The inserting direction X1 is a direction opposite to the direction X2 shown in FIG. 9. In the insertion, a front portion of the cassette 10 is inserted first. The above-mentioned front portion is a portion of the cassette 10 including the lid unit 102. Thus, the cassette 10 is inserted into the holder unit 210 in the direction X1 shown in FIG. 2A. A state where the cassette 10 has been thus inserted into the holder unit 210 is such as that shown in FIG. 1. In FIG. 1, the front portion of the cassette 10 cannot be seen but a rear portion, opposite to the front portion, of the cassette 10 can be seen. When the cassette 10 is withdrawn from the holder unit 210 in the direction X2 shown in FIG. 9, the front portion of the cassette 10 is withdrawn last.

The above-mentioned angle Θ=approximately 15°. This angle Θ is an angle formed between the top plates 220R-1 and 220L-1 of the cassette holders 220R and 220L and the direction along which the sliding portions 252R and 252L extend. The above-mentioned top plates 220R-1 and 220L-1 of the cassette holders 220R and 220L shown in FIGS. 5B and 9 come into contact with the top surface of the cassette 10 so as to hold the cassette 10 as described above.

This angle Θ achieves the following operation of the sub-lid 104 in the opened state: A case is considered in which the cassette 10 is being withdrawn from the holder unit 210 in the opened state of the lid unit 102 of the cassette 10. In the considered case, while the cassette 10 moves in the direction X2 shown in FIG. 9, the sliding portions 252R and 252L press the end portions 104R and 104L of the sub-lid 104, respectively, downwardly and approximately vertically. Ordinarily, the sub-lid 104 is supported in the cassette 10 at the end portions 104R and 104L. Therefore, it is effective that only the end portions of the sub-lid 104 are pressed by the sliding portions 252R and 252L and a middle portion of the sub-lid 104 is, at least at the beginning of the pressing, not pressed.

It may be supposed that the lid pressing member 250 did not have the cut out portion 253 and thus the sliding portions 252R and 252L were a single rectangular sliding portion. It is likely that, since the sub-lid 104 is rotatably supported on the main lid 103 only at the end portions in a typical structure of the lid unit 102, the middle portion thereof may project upward as a result of deformation of the sub-lid 104. If the middle portion projected upward and if the sliding portion 252R and 252L were the single rectangular sliding portion as mentioned above, the thus-projecting middle portion might be first pressed by the sliding portion. As a result, since the middle portion of the sub-lid 104 was not directly supported in the cassette 10, the sub-lid 104 might be further deformed. As a result, the sub-lid 104 might not be effectively pressed down by the sliding portion and thus the cassette 10 might not be smoothly withdrawn from the holder unit 210. Further, the above-mentioned further deformation might damage the sub-lid.

In contrast to the above-supposed shape of the lid pressing member, the shape of the lid pressing member 250 having the cut out portion 253 between the pair of the sliding portions 252R and 252L, shown in FIG. 7, according to the present invention is advantageous. This is because the pair of sliding portions 252R and 252L press the end portions 104R and 104L which are supported in the cassette 10 as mentioned above. Therefore, the pressing of the end portions results in smooth moving of the sub-lid 104.

As a result of the sliding portions 252R and 252L effectively pressing down the sub-lid 104, force is applied to the sub-lid 104 in a direction such that the sub-lid 104 can be effectively disengaged from the main lid 103. As a result of the sub-lid 104 being disengaged from the main lid 103, the main lid 103 and sub-lid 104 can be smoothly rotated and thus the lid unit 102 can smoothly enter into the closed state.

Further, as shown in FIG. 7, the lid pressing member 250, via the mounting portion 251, is screwed onto the top plate 212 of the frame 211. Further, as described above, the cassette holders 220R and 220L are supported on the frame 211 in a condition in which the holders 220R and 220L can move upwardly and downwardly. When the holder unit 210 is positioned at the above-mentioned top position, that is, the inserted position, the leaf springs 215R and 215L press down the cassette 10 held by the cassette holders 220R and 220L. As a result, the cassette 10 presses down the cassette holders 220R and 220L via the bottom plates 220R-2 and 220L-2. Thus, the cassette holders 220R and 220L are positioned at the lowest position together with the cassette 10 with respect to the frame 211. In this state, in comparison to the state in which the cassette holders 220R and 220L are positioned at the higher position, a distance between the mounting portion 251 of the lid pressing member 250 and the sub-lid 104 is large. Such a spatial relationship is advantageous for preventing the sub-lid 103 from being undesirably engaged by the mounting portion 251 when the sub-lid 104 passes through below the mounting portion 251 in the cassette withdrawing operation, although the lid pressing member 250 is added to the cassette compartment mechanism. It is noted that, ordinarily, the video cassette recording/reproducing apparatus having such a cassette compartment mechanism has a structure such that the cassette withdrawing operation can be performed only when the holder unit 210 is positioned at the top position. In other words, the lid pressing member 250 is provided effectively using a space created as a result of the cassette 10 being positioned at the lowest position when the holder unit 210 is positioned at the top position.

The lid pressing member 250 is made of a metal plate and at least the bottom surfaces of the sliding portions 252R and 252L are chromated. The chromating will now be described. First, the bottom surfaces are electrogalvanized; then the surfaces are immersed in chromic acid solution with black paint; then the surface are immersed in alkaline solution so as to neutralize the surfaces; and then the surfaces are dried.

As a result, friction of the sliding portions 252R and 252L with the sub-lid 104 can be reduced. Therefore, the sliding portions 252R and 252L can smoothly press down the sub-lid 104 and the surfaces of the sliding portions 252R and 252L are prevented from being hurt as a result of the sub-lid 104 sliding on the surfaces of the sliding portions.

Further, the angle Θ formed between the top plates 220R-1 and 220L-1 of the cassette holders 220R and 220L and the direction along which the sliding portions 252R and 252L extend is not limited to the approximately 15°. Other angles can be applied to the angle Θ so as to match a particular structure of the cassette compartment mechanism and one of the cassette to be applied to the cassette compartment mechanism. Thus, it is possible that the lid unit 102 under the opened state can be effectively smoothly pressed down to enter the closed state.

Further, the lid pressing member 250 is useful for reinforcing the structure of the holder unit 210, in particular, the top plate 212 of the frame 211. Therefore, the mechanical strength of the frame 211 itself can be reduced.

Further, the present invention is not limited to the above-described embodiments, and variations and modifications may be made without departing from the scope of the present invention.

What is claimed is:

1. A cassette compartment mechanism into which a cassette is inserted and withdrawn along a direction of cassette movement, the cassette having a pair of spaced apart side walls lying parallel to the direction of cassette movement, the cassette having an upper wall lying normal to the side walls, the cassette containing a recording tape and having a lid unit generally lying normal to the direction of cassette movement, the lid unit being movable between a closed state in which the lid unit is generally flush with the upper wall of the cassette and an opened state in which the lid unit extends above the upper wall of the cassette, the lid unit having a pair of end portions spaced in a direction normal to the direction of cassette movement, said cassette compartment mechanism comprising:

a holder unit for receiving the cassette therein when the cassette is inserted in the mechanism, the cassette being received within a pair of spaced sides of the holder unit that are adjacent the side walls of the cassette; and a lid pressing member having a pair of spaced sliding portions with a part rigidly attached to a frame by which said holder unit is supported, said lid pressing member being positioned above the cassette when said cassette is received in the holder unit, said sliding portions being aligned with the end portions of said lid unit and coming into contact with the pair of end portions of said lid unit of said cassette while said cassette is being withdrawn from said holder unit if said lid unit is in the opened state, said pair of sliding portions sloping downwardly from said attached part toward the cassette in the direction of withdrawal of the cassette from the cassette compartment mechanism, said sliding portions moving the lid unit from its opened to its closed state as a result of contacting the pair of end portions of said lid unit.

2. The cassette compartment mechanism according to claim 1, wherein each of said pair of sliding portions has a downward slope forming an angle between said portion and the direction of cassette movement of equal to or less than 15°.

3. The cassette compartment mechanism according to claim 1, wherein:

said lid pressing member has a cut out part between said pair of sliding members which is rigidly attached to said frame, said lid pressing member coming into contact only with said two end portions of said lid unit and, at least at first, does not come into contact with a middle portion of said lid unit, while said cassette is being withdrawn from said holder unit if said lid unit is in said opened state.

4. The cassette compartment mechanism according to claim 1, wherein:

said lid unit comprises a main lid and a sub-lid cooperatively covering an opening formed on said cassette, said main lid being rotatably supported on said cassette, and said sub-lid being rotatably supported on said main lid; and said pair of sliding portions come into contact with said sub-lid.

5. The cassette compartment mechanism according to claim 4, wherein said cassette comprises a video cassette used in a helical scan video cassette system using 8-mm magnetic tape.

6. The cassette compartment mechanism according to claim 1, wherein:

said holder unit comprises:

a cassette holder for holding said cassette; and wherein said frame is further defined as a frame on which said cassette holder is supported in a manner in which said cassette holder can move between a higher position and a lower position with respect to a position of said frame, said frame being supported on a base in a manner in which said frame can move between a top position and a bottom position, a distance between said higher position and lower position being considerably smaller than a distance between said top position and bottom position; and means for moving said cassette holder in a manner in which said cassette holder is positioned at said lower position when said frame is positioned at said top position, and in which said cassette holder is positioned at said higher position when said frame is positioned at said bottom position;

and wherein said lid pressing member is mounted on a top portion of said frame and said pair of sliding portions extend in a direction downward by a certain angle from the direction of cassette movement, said certain angle being less than 45°.

7. The cassette compartment mechanism according to claim 6, wherein:

an operator can insert/withdraw said cassette into/from said cassette holder when said frame is positioned at said top position; and a recording/reproducing apparatus provided with said cassette compartment mechanism can record data into/reproduce data out from said recording tape when said frame is positioned at said bottom position.

8. The cassette compartment mechanism according to claim 6, wherein said cassette holder comprises a right cassette holder and a left cassette holder.

9. The cassette compartment mechanism according to claim 1, further comprising leaf springs which press the cassette being received by said holder unit and thus prevent said cassette from moving in said holder unit.

* * * * *